United States Patent
Ladd et al.

(10) Patent No.: US 9,283,438 B2
(45) Date of Patent: Mar. 15, 2016

(54) GOLF BALLS WITH OXYGEN AND MOISTURE BLOCKING PROTECTIVE PAINT LAYER

(75) Inventors: Derek A. Ladd, Fairhaven, MA (US); Nicholas M. Nardacci, Fairhaven, MA (US); Edmund A. Hebert, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 540 days.

(21) Appl. No.: 13/527,661

(22) Filed: Jun. 20, 2012

(65) Prior Publication Data

US 2013/0344991 A1  Dec. 26, 2013

(51) Int. Cl.
*A63B 37/00* (2006.01)
*C09D 7/12* (2006.01)
*C09D 5/00* (2006.01)

(52) U.S. Cl.
CPC ......... *A63B 37/0022* (2013.01); *A63B 37/0077* (2013.01); *A63B 37/0074* (2013.01); *A63B 37/0076* (2013.01); *A63B 2225/02* (2013.01); *C09D 5/00* (2013.01); *C09D 7/1216* (2013.01)

(58) Field of Classification Search
None
See application file for complete search history.

(56) References Cited

U.S. PATENT DOCUMENTS

| | | | |
|---|---|---|---|
| 5,484,870 A | 1/1996 | Wu | 528/28 |
| 5,688,191 A | 11/1997 | Cavallaro et al. | 473/373 |
| 5,713,801 A | 2/1998 | Aoyama | 473/354 |
| 5,766,097 A * | 6/1998 | Horiuchi et al. | 473/365 |
| 5,803,831 A | 9/1998 | Sullivan et al. | 473/374 |
| 5,849,168 A | 12/1998 | Lutz | 264/755 |
| 5,885,172 A | 3/1999 | Hebert et al. | 473/354 |
| 5,919,100 A | 7/1999 | Boehm et al. | 473/354 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,149,535 A | 11/2000 | Bissonnette et al. | 473/354 |
| 6,207,784 B1 | 3/2001 | Rajagopalan | 528/71 |
| 6,306,990 B1 | 10/2001 | Hien et al. | 526/272 |
| 6,503,156 B1 | 1/2003 | Sullivan | 473/374 |
| 6,506,130 B2 | 1/2003 | Sullivan | 473/374 |
| 6,787,191 B2 | 9/2004 | Hanahata et al. | 427/387 |
| 6,811,497 B1 * | 11/2004 | Jones et al. | 473/376 |
| 6,835,794 B2 | 12/2004 | Wu et al. | 528/64 |
| 7,951,870 B2 * | 5/2011 | Rajagopalan et al. | 525/66 |
| 2001/0009310 A1 | 7/2001 | Hebert et al. | 264/129 |
| 2001/0018375 A1 | 8/2001 | Hayashi et al. | 473/371 |
| 2001/0019971 A1 | 9/2001 | Hayashi et al. | 473/371 |
| 2002/0025862 A1 | 2/2002 | Sullivan et al. | 473/374 |
| 2002/0028885 A1 | 3/2002 | Sullivan et al. | 525/221 |
| 2003/0176242 A1* | 9/2003 | Mano | A63B 37/12 473/378 |
| 2005/0148692 A1* | 7/2005 | Burchill et al. | 523/218 |
| 2007/0060417 A1* | 3/2007 | Cavallaro | 473/371 |
| 2011/0077106 A1* | 3/2011 | Fitchett | 473/385 |
| 2011/0224024 A1* | 9/2011 | Tutmark | A63B 37/0022 473/378 |

* cited by examiner

*Primary Examiner* — David Buttner

(74) *Attorney, Agent, or Firm* — Smith, Gambrell & Russell, LLP

(57) ABSTRACT

The present invention relates to compositions for golf equipment that can be applied as a thin paint layer to block oxygen and moisture from underlying structural layers. The compositions include a polymer component present in a resin system, a stabilizing component, and porous particles.

20 Claims, 2 Drawing Sheets

GOLF BALLS WITH OXYGEN AND MOISTURE BLOCKING PROTECTIVE PAINT LAYER

FIELD OF THE INVENTION

The present invention relates to a paint composition for use in golf equipment. In particular, the paint compositions of the invention include a urethane-based paint that blocks oxygen and prevents moisture penetration. The paint compositions of the invention may be used to paint any layer of a golf ball. Golf balls including layers formed of hydrophilic materials with the paint composition of the invention disposed thereon are contemplated.

BACKGROUND OF THE INVENTION

Golf manufacturers have been experimenting with various materials and manufacturing methods for golf balls over the years in an attempt to improve overall performance and durability of the equipment while maintaining a desirable appearance and/or protect any indentifying indicia. However, at least with respect to golf balls, it remains difficult for manufacturers to properly attain the desired long-term appearance of conventional golf ball compositions, such as urethanes, used in golf ball components without adversely affecting ball performance. For example, conventional golf ball cover materials, i.e., balata, ionomer resins, and urethanes, suffer from abrasion and shear from repeated contact with golf clubs. Accordingly, many golf balls have at least one layer of "paint" applied to the cover material to camouflage the appearance flaws of the underlying layer.

While such a paint generally aids in camouflaging the appearance flaws of the underlying layer when exposed to the environment, the paint itself may be subject to damage over time. Furthermore, conventional paints do not typically block moisture, dust or dirt, or mold. Thus, manufacturers are typically forced to apply a translucent or transparent coating over the paint to further increase the abrasion resistance and shear from repeated contact with golf clubs and protect the overall appearance of the ball and any indicia thereon. In addition, coatings are used to improve the aesthetic quality of the equipment because of the high gloss. These coatings generally include a clear primer layer and a clear top layer. The primer layer is typically applied to promote adhesion or to smooth the surface roughness before the top coat(s) is added.

Conventional coatings are typically made from urethanes, ureas, and hybrids thereof, polyesters, and acrylics and may be classified as either water-based or non-aqueous solvent-based systems. One component systems are generally made up of minute polymeric particles (reacted or partially reacted) that are suspended or dispersed in one or more solvents. In contrast, the primary reactants in two component systems must be kept separate from one another until the actual coating need be applied to the golf equipment.

While some conventional coating systems do impart a measure of abrasion and impact resistance, a continuing need exists for improved paints or coatings capable of blocking moisture and oxygen, as well as providing enhanced abrasion resistance and adherence without negatively affecting the performance of the golf equipment. In addition, golf balls having such a paint layer would be advantageous. The present invention addresses such materials, methods of forming the materials, and portions of golf balls formed from these materials.

SUMMARY OF THE INVENTION

The present invention is directed to a golf ball including a core and a cover, wherein at least one paint layer is disposed about the core or cover, wherein the paint layer is formed from a composition including: a polymer component; and a paste including porous particles and a stabilizing component, wherein the porous particles have an average diameter between about 1 μm to about 5.0 mm and an average pore size from about 100 μm or less, wherein the stabilizing component include a symmetrical copolymer including two alkylene oxide blocks having the same chain length surrounding an alkylene oxide block, and wherein the paint layer has a thermal conductivity ranging from about 0.03 to about 0.3 Btu/hr ft ° F.

In one embodiment, the stabilizing component includes two ethylene oxide blocks of the same chain length surrounding a propylene oxide block. In another embodiment, the stabilizing component includes $EO_x$—$PO_y$-$EO_z$ where x, y, and z represent chain length, and wherein x and z are equal. The polymer component may include polyesters, epoxies, urethanes, cellulosics, alkyds, acrylics, and mixtures and precursors thereof.

The porous particles may have an average diameter of about 5 μm to about 2500 μm. In one embodiment, the porous particles have an average diameter of about 100 μm to about 500 μm. The thermal conductivity of the paint layer may range from about 0.05 to about 0.2 Btu/hr ft ° F.

The present invention is also directed to a golf ball including a core, a cover, and a paint layer disposed on the cover, wherein the paint layer is formed from a composition including: a resin system including a polymer component and a stabilizing component, wherein the stabilizing component is selected from the group consisting of ethylene oxide-propylene oxide block copolymers, poly $C_2$-$C_3$ alkoxylated $C_{12}$-$C_{18}$ saturated or unsaturated fatty alcohols, poly $C_2$-$C_3$ alkoxylated hydrogenated or partially hydrogenated castor oils, poly $C_2$-$C_3$ alkoxylated hydrogenated or partially hydrogenated soybean oils, polydimethyl siloxane $C_2$-$C_3$ alkoxylates, and sorbitan esters of $C_{12}$-$C_{18}$ saturated or unsaturated fatty acids; and porous particles have an average diameter between about 1 μm to about 5.0 mm and an average pore size from about 100 μm or less, and wherein the paint layer has a thermal conductivity ranging from about 0.03 to about 0.3 Btu/hr ft ° F. The thermal conductivity may range from about 0.05 to about 0.2 Btu/hr ft ° F. In one embodiment, the thermal conductivity ranges from about 0.055 to about 0.19 Btu/hr ft ° F.

In one embodiment, the resin system is solvent-based. In another embodiment, the resin system includes an aqueous emulsion of the polymer component. The porous particles may have an average diameter ranging from about 1000 μm to about 4.0 mm. In one embodiment, the porous particles may have an average diameter ranging from about 5 μm to about 30 μm.

The polymer component may include an acrylic copolymer, an acrylic styrene copolymer, vinyl acrylic copolymer, epoxy acrylic copolymer, acrylic vinyl acetate copolymer, a styrene butadiene copolymer, a cellulose acetate polymer, an alkyd, a polyester polymer, or combinations thereof.

The present invention is directed to a golf ball including a core, a cover, and a paint layer disposed on the cover, wherein the cover includes polyurethane, polyurea, or a combination thereof, and wherein the paint layer is formed from a composition including:
a polymer component; a stabilizing component, wherein the stabilizing component is selected from the group consisting of ethylene oxide-propylene oxide block copolymers, poly $C_2$-$C_3$ alkoxylated $C_{12}$-$C_{18}$ saturated or unsaturated fatty alcohols, poly $C_2$-$C_3$ alkoxylated hydrogenated or partially hydrogenated castor oils, poly $C_2$-$C_3$ alkoxylated hydrogenated or partially hydrogenated soybean oils, polydimethyl siloxane $C_2$-$C_3$ alkoxylates, and sorbitan esters of $C_{12}$-$C_{18}$ saturated or unsaturated fatty acids; and porous particles have an average diameter between about 1 μm to about 5.0 mm and an average pore size from about 100 μm or less, and wherein the paint layer has a thermal conductivity ranging from about 0.05 to about 0.2 Btu/hr ft ° F.

In one embodiment, the core includes polybutadiene. In another embodiment, the polymer component is present in an aqueous emulsion. In yet another embodiment, the polymer component is part of a solvent-based resin system. In still another embodiment, the porous particles include organic and inorganic aerogels, organic and inorganic xerogels, or combinations thereof.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
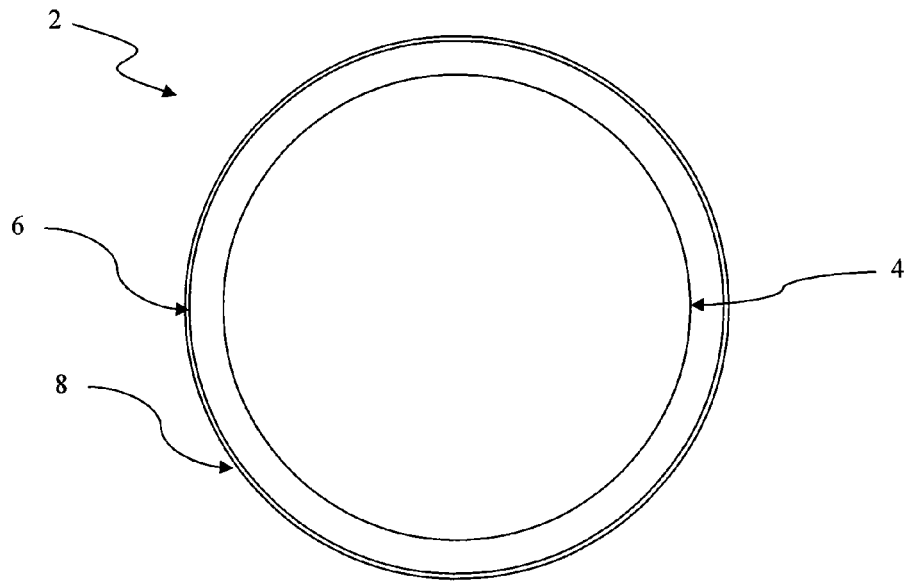
FIG. 1 is a cross-sectional view of a two-piece golf ball with a paint layer formed from a composition of the invention.

The present invention relates to compositions for use in a variety of golf equipment including one-piece, two-piece or multilayer balls, as well as golf club components. Because of the oxygen and moisture-blocking properties, the paint compositions of the invention may be used as a paint or coating over a layer or component formed from hydrophilic materials. In addition, the unique properties of the paint composition allow a manufacturer to streamline the conventional protective paints and coatings and apply the paint composition of the invention with improved results.

The Paint Compositions of the Invention

The paint compositions of the invention include a polymer component used to form an aqueous emulsion or a solvent-based resin system, porous particles, and a stabilizing component. Each of the components will be discussed in greater detail below.

Polymer Component

The polymer component may be selected from a number of suitable film-forming polymers. Suitable polymer components include, for example, polyesters, epoxies, urethanes, cellulosics, alkyds, acrylics, and mixtures and precursors thereof.

In one embodiment, the polymer component may be an acrylic copolymer, an acrylic styrene copolymer, vinyl acrylic copolymer, epoxy acrylic copolymer, acrylic vinyl acetate copolymer, and combinations thereof. In another embodiment, the polymer component may be styrene butadiene copolymer, cellulose acetate polymer, alkyd, polyester polymer, and combinations thereof. In yet another embodiment, the polymer component is a waterborne polyurethane dispersion. For example, a suitable polymer component may be a copolymer formed from a polyalkylene glycol, an iso-cyanate, and a crosslinking agent/hydrophilic agent. In this regard, the polymer component may be a copolymer formed from polypropylene glycol, isophorone diisocyanate, and dimethylolpropionic acid (DMPA), dimethylolbutanoie acid (DMBA), or combinations thereof. In still another embodiment, the polymer component is nitrocellulose or a nitrocellulose alkyd.

In one embodiment, the polymer component may be a functionalized polymer that has 1,2-dicarboxylic acid monoester groups with an acid-labile, hydrolysis-stable polymer unit (I), a thermally stable polymer unit (II), a second thermally stable polymer unit (III), and a polymer unit having reactive groups (IV), where (I) is of the structure:

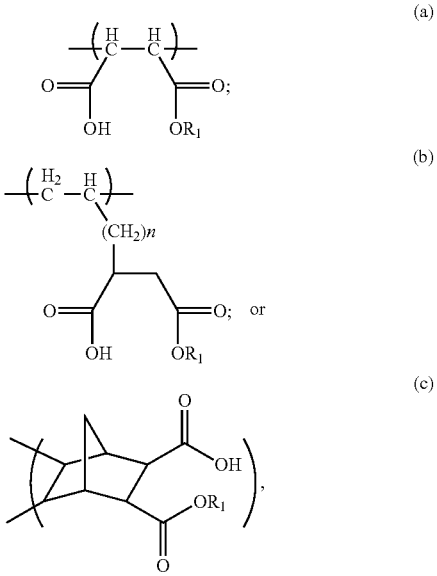

where $R_1$ may be a hydrocarbon radical bonded via a tertiary C atom to the O atom having between 4 and 10 carbon atoms (e.g., $-C(CH_3)_3$, $-C(CH_3)_2-C_2H_5$, or $-C_{10}H_{15}$), where n is from 0 to 3, and where (II) is of the structure:

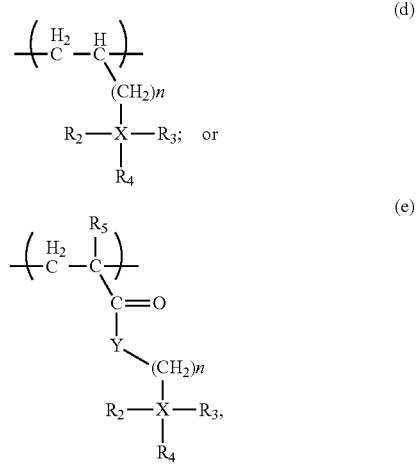

where $R_2$, $R_3$ and $R_4$ may independently be a $C_1$ to $C_6$ alkyl or alkoxy, $C_6$ to $C_{18}$ aryl or aryloxy, aralkyl having a $C_6$ to $C_{18}$ aryl group and a $C_1$ to $C_4$ alkylene radical, where X may be Si or Sn, where Y may be O or NH, where n is from 0 to 3, and where (III) is of the structure:

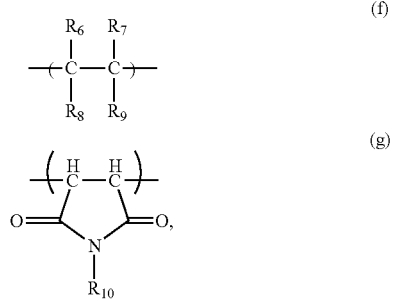

where $R_5$ may be H or $C_1$ to $C_6$ alkyl, where $R_6$, $R_7$, $R_8$, and $R_9$ may independently be H, $C_1$ to $C_6$ alkyl, $C_6$ to $C_{18}$ aryl, halogen, CN, methoxyphenyl, methoxytrimethylsilane compound with toluene (1:1), methanol compound with toluene (1:1), tert-butyl p-tolyl carbonate, acetic acid, ethyltrimethylsilane, tetramethylsilane, trimethoxy(methyl)silane, or —$COOR_{15}$ where $R_{15}$ may be H, $C_1$ to $C_6$ alkyl, $C_6$ to $C_{18}$ aryl, vinyl, allyl, or but-3-en-2-one, and where (IV) is of the structure:

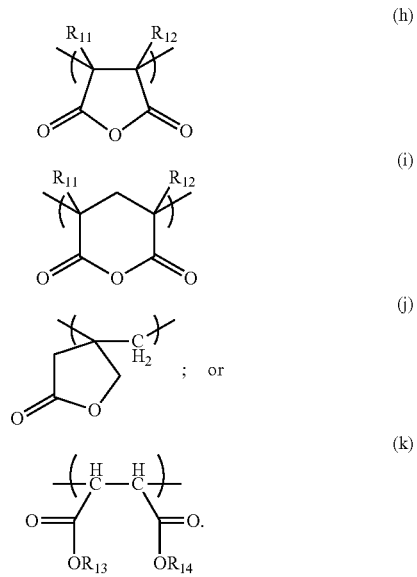

where $R_{10}$ may be H, $C_1$ to $C_6$ alkyl, $C_2$ to $C_6$ alkenyl $C_6$ to $C_{18}$ aryl, halogen, or a halogen-substituted $C_1$ to $C_6$ alkyl, where $R_{11}$ and $R_{12}$ may independently be linear $C_1$ to $C_{18}$ alkyl, where $R_{13}$ and $R_{14}$ may independently be linear $C_1$ to $C_{18}$ alkyl or tert-butyl. Further examples of such film-forming polymers can be found in U.S. Pat. No. 6,306,990, which is incorporated herein by reference in its entirety.

It is also contemplated that the polymer component is a mixture of any of the film-forming polymers discussed above.

In one embodiment, the polymer component has a Brookfield viscosity ranging from about 10 to about 1000 mPa·s. In one embodiment, the Brookfield viscosity of the polymer component ranges from about 100 to about 500 mPa·s, preferably from about 200 to about 400 mPa·s, and more preferably from about 250 mPa·s to about 300 mPa·s. In another embodiment, the Brookfield viscosity of the polymer component is less than about 1000 mPa·s. In still another embodiment, the polymer component has a Brookfield viscosity of less than about 500 mPa·s.

Porous Particles

The porous particles for use in the paint composition of the invention preferably have a high porosity, i.e., at least about 70 percent. In one embodiment, the porous particles have a porosity of at least about 75 percent and preferably at least about 80 percent. In another embodiment, the porosity of the porous particles is at least about 90 percent.

In addition, the average diameter of the porous particles preferably ranges from about 1 µm to about 5.0 mm. In one embodiment, the average diameter is from about 2 µm to about 4.5 mm. In this aspect of the invention, the average diameter may range from about 5 µm to about 2500 µm, preferably from about 10 µm to about 1500 µm. For example, the porous particles may have an average diameter of about 100 µm to about 500 µm. In still another embodiment, the porous particles range from about 5 µm to about 75 µm, preferably about 5 µm to about 30 µm. Alternatively, larger particles, i.e., particles ranging from about 500 µm to about 5.0 mm, may be used depending on the ultimate application of the paint. For example, the average diameter of the porous particles may range from about 1000 µm to about 4.0 mm.

In another aspect, the average diameter of the porous particles is in the nanometer range. For example, the average diameter may range from about 2 nm to about 50 nm (mesoporous range). In another embodiment, the average diameter ranges from about 5 nm to about 25 nm. In still another embodiment, the average diameter ranges from about 5 nm to about 15 nm.

The pore size of the porous particles, i.e., the average size of the pores within each particle, is preferably no greater than about 100 µm. In one embodiment, the pore size is between about 0.1 µm and 75 µm. In another embodiment, the pore size ranges from about 1 µm and 50 µm. In still another embodiment, the pore size ranges from about 5 µm to about 30 µm.

Because of their high porosity and small pore diameters, the porous particles for use with the present invention have a high surface area. For example, the surface area of the porous particles may be about 500 $m^2/g$ to about 2500 $m^2/g$. In one embodiment, the porous particles have a surface area ranging from about 500 $m^2/g$ to about 900 $m^2/g$. In another embodiment, the surface area of the porous particles is greater than about 500 $m^2/g$, preferably about 600 $m^2/g$ or greater. In yet another embodiment, the porous particles have a surface area ranging from about 600 $m^2/g$ to about 800 $m^2/g$. However, as would be understood by those of ordinary skill in the art, the surface area is highly dependent on density and whether or not impurities have been introduced (intentionally or unintentionally) into the porous particles. In addition as would be understood by those of ordinary skill in the art, the surface area of certain porous particles, e.g., carbon aerogels, may be increased post-production by placing it under a flow of steam or hydrogen at elevated temperatures (400° C.-1000° C.).

The porous particles may be spherical, spheroidal, or irregularly shaped.

Suitable porous particles for use with the present invention include, but are not limited to, organic and inorganic aerogels and xerogels. As used herein, the term "organic aerogel" refers to any aerogel with a framework primarily comprised of organic polymers. There are many different kinds of aerogels suitable for use with the present invention, each with properties arising from the polymer which makes up the aerogel's framework. Non-limiting examples of organic aerogels include aerogels made from resorcinol formaldehyde (RF), phenol formaldehyde, melamine formaldehyde, cresol formaldehyde, phenol furfuryl alcohol, polyacrylamides, polyacrylonitriles, polyacrylates, polycyanurates, polyfurfural alcohol, polyimides, polystyrenes, polyurethanes, polyvinyl alcohol dialdehyde, epoxies, agar, agarose, and mixtures thereof.

Examples of an inorganic aerogel and xerogels suitable for use with the present invention include, but are not limited to, silica xerogels, silica aerogels, and combinations thereof. Those of ordinary skill in the art would understand that any number of porous silica particles produced by a sol-gel reaction in which a sol (i.e., a colloid-like dispersion of particles in a liquid) is formed as an intermediate and then transformed into a gel in a solid form is suitable for use in the present invention. In particular, hydrophilic silica aerogels, hydrophobic silica aerogels, fumed silicas, and wax-treated silica xerogels are contemplated for use in the present invention. Suitable methods for making such porous particles include those outlined in U.S. Pat. No. 6,787,191, the entire disclosure of which is incorporated by reference herein.

In addition, carbon aerogels, carbon xerogels, and combinations thereof may be used as the porous particles for use in the present invention. For example, carbon aerogels made from organic aerogels made from polymers of resorcinol, melamine, phlorglucinol, and acetic acid are contemplated for use with the present invention.

In one embodiment, the porous particles are high strength ceramic microspheres. For example, the porous particles may be high strength ceramic microspheres with compressive strengths up to about 6,000 psi, a softening point ranging from about 1600° C. to about 1900° C., preferably about 1800° C., and a thermal conductivity ranging from about 0.05 to about 0.2 Btu/hr ft ° F. Commercially available high strength ceramic microspheres may be obtained from HyTech of Melbourne, Fla. under the tradename ThermaCels™.

Stabilizing Component

Without being bound by any particular theory, the use of a low molecular weight stabilizing component in the paint of the invention may aid in allowing higher load levels (as compared to paints without the stabilizing component) and result in a viscosity suitable for painting/coating applications.

In this aspect of the invention, the molecular weight of the stabilizing component is preferably less than about 5000. In one embodiment, the stabilizing component is about 4000 or less. In another embodiment, the molecular weight of the stabilizing component is between about 1000 and 4000.

Suitable stabilizing components include, but are not limited to, symmetrical copolymers having two alkylene oxide blocks of the same chain length surrounding an alkylene oxide block. In one embodiment, the stabilizing component is a symmetrical copolymer having two ethylene oxide blocks of the same chain length surrounding a propylene oxide block. For example, $EO_x$—$PO_y$—$EO_z$ where x and z are the same is contemplated for use as the stabilizing component. Other non-limiting examples of suitable stabilizing components include poly $C_2$-$C_3$ alkoxylated $C_{12}$-$C_{18}$ saturated or unsaturated fatty alcohols, poly $C_2$-$C_3$ alkoxylated hydrogenated or partially hydrogenated castor oils, poly $C_2$-$C_3$ alkoxylated hydrogenated or partially hydrogenated soybean oils, polydimethyl siloxane $C_2$-$C_3$ alkoxylates, and sorbitan esters of $C_{12}$-$C_{18}$ saturated or unsaturated fatty acids.

Additives

The paint composition of the present invention may also include any of a variety of additives. Examples of such additives include, but are not limited to, colorants, pigments, UV stabilizers, coalescing agents, rheological-control additives and wetting agents, defoamers, surfactants, curing agents, catalysts, drying agents, and pH adjustment agents. One of ordinary skill in the art would be aware of the relative amounts of each type of additive to include in the paint composition of the invention to achieve certain results For example, since the coalescing agent lowers the effective glass transition temperature of the polymer and promotes the softening of the resin during drying, a coalescing agent may be present in an amount ranging from about 10 percent to about 40 percent by weight of the paint composition. In one embodiment, the coalescing agent is present in an amount ranging from about 10 percent to about 30 percent by weight of the paint composition.

The rheological-control additive (i.e., flow additives), promotes the wetting of the substrate by the surface coating composition and the leveling of the paint. When included, rheological-control additives may be included in an amount ranging from about 0.5 percent to about 5 percent by weight of the paint composition. In one embodiment, a flow additive comprises about 1 percent to about 3 percent by weight of the paint composition. Suitable non-limiting examples of rheological-control additives include treated attapulgite clays, fine-particle-size silica aerogel-type pigments, ultrahigh-molecular-weight polymers, which may be used to thicken non-aqueous coatings. Modified cellulosic polymers, carrageenan, high-molecular-weight water-soluble polymers (e.g., polyacrylic acid), may also be employed in aqueous systems.

Defoamers, which may be added to reduce the presence of bubbles in the paint upon mixing of the components, may be included in an amount ranging from about 0.01 percent to about 4 percent by weight of the paint composition. In one embodiment, the defoamer is present in an amount of about 0.01 percent to about 0.5 percent by weight of the paint composition. In another embodiment, the defoamer is present in an amount of about 0.5 percent to about 0.75 percent by weight of the paint composition.

A surfactant may be added to reduce the surface tension of the paint. Any suitable concentration of surfactant can be present in the paint, such as about 0.01 percent to about 3 percent by weight of the paint composition.

Method of Forming the Paint Composition

When the polymer component is used in a solvent-based system, a number of solvents are suitable for use. For example, the solvent may be water, alcohols, ketones, esters, ethers, aromatics, alkyls, or mixtures thereof. In one embodiment, the solvent may be an aliphatic hydrocarbon (such as hexane), alcohol, acetate, glycol ether, glycol ether ester, and mixtures thereof. In another embodiment, the solvent includes aromatic compounds such as toluene and xylene. In still another embodiment, the solvent includes mineral spirits, methyl ethyl ketone, n-butyl acetate, t-butyl alcohol, ethylene glycol, and mixtures thereof. As known to those of ordinary skill in the art, mixtures of solvents may be used to control solvency and evaporation. Any suitable concentration of solvent may be present in the system, such as up to about 80 percent by weight of the system.

The polymer component may also be included in an aqueous emulsion.

Whether solvent-based or an aqueous emulsion, the resulting resin formulation is preferably mixed with the stabilizing component prior to adding the porous particles. The resin formulation may comprise about 40 percent to about 70 percent by weight of the paint composition. In one embodiment, the resin formulation accounts for at least about 45 percent of the paint composition (by weight of the paint composition).

For example, the resin formulation may be present in the paint composition of the invention in an amount ranging from about 45 percent to about 55 percent by weight of the paint composition.

The stabilizing component may be present in any amount that achieves the purpose of this component. In one embodiment, the stabilizing component is present in an amount of about 50 percent to about 80 percent by weight of the porous particles. In one embodiment, the stabilizing component comprises about 55 percent to about 75 percent by weight of the porous particles. For example, the stabilizing component may be present in the paint composition in an amount ranging from about 2 percent to about 4 percent by weight of the paint composition when the porous particles comprise about 4 percent to about 6 percent by weight of the paint composition.

The porous particles are included in the paint composition of the invention in an amount ranging from about 1 percent to about 10 percent by weight of the paint composition. For example, the porous particles may be present in an amount ranging from about 2 percent to about 6 percent by weight of the paint composition. The porous particles are added into the paint composition under low shear conditions after all of the components (including any additives) have been blended. In one embodiment, the porous particles, stabilizing component, and a small amount of water are mixed together separately under low shear conditions and then added to the main composition in a paste form.

Water and other additives may comprise the remaining portion of the paint composition. For example, water may be incorporated into the paint composition in an amount ranging from about 20 percent to about 50 percent by weight of the paint composition. In one embodiment, water accounts for about 25 percent to about 35 percent by weight of the paint composition.

The resulting composition has a Brookfield viscosity ranging from about 15,000 mPa·s or less. In one embodiment, the paint composition of the invention has a Brookfield viscosity of about 13,000 mPa·s or less. In another embodiment, the Brookfield viscosity of the paint composition of the invention ranges from about 5,000 mPa·s to about 10,000 mPa·s.

Golf Ball Construction

As discussed briefly above, the paint compositions of the present invention may be used with any type of ball construction including, but not limited to, one-piece, two-piece, three-piece, and four-piece designs, a double core, a double cover, an intermediate layer(s), a multilayer core, and/or a multilayer cover depending on the type of performance desired of the ball. That is, the paint compositions of the invention may be used to paint or coat a core, an intermediate layer, and/or a cover of a golf ball.

Structural Layers

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

The cores of golf balls formed according to the invention may be solid, semi-solid, hollow, fluid-filled or powder-filled, one-piece or multi-component cores. Accordingly, the cores of the golf balls of the invention may be formed from a variety of core materials. For example, suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. The cores may have a diameters ranging from about 1.4 inches to about 1.62 inches and compressions ranging from about 30 to about 120 atti.

When the golf ball of the present invention includes an intermediate layer, which may also include more than one layer, this layer may be incorporated with a single or multi-layer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

The intermediate layers and/or cover layers may be formed from a number of thermoplastic and thermosetting materials. For example, the intermediate and cover layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters. For example, the intermediate and/or cover layer(s) may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate and/or cover layer(s) may also be formed from the compositions as disclosed in U.S. Pat. No. 5,688,191. Golf balls according to the invention may also be formed having intermediate and/or cover layer(s) formed from polyurethane, polyurea, and polybutadiene materials, as discussed in U.S. Pat. No. 6,835,794. The entire disclosures of these patents and publications are incorporated herein by express reference thereto. The intermediate and cover layers may have thicknesses ranging from about 0.002 inches to about 0.12 inches. In one embodiment, the cover thickness is about 0.05 inches or less, preferably from about 0.02 inches to about 0.05 inches, and more preferably about 0.02 inches and about 0.045 inches. When part of a three-piece ball or multi-layer ball according to invention, the intermediate and/or inner cover layer may have a thickness ranging from about 0.015 inches to about 0.06 inches. In another embodiment, the intermediate layer thickness is about 0.05 inches or less, more preferably about 0.01 inches to about 0.045 inches.

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

Figure 2:
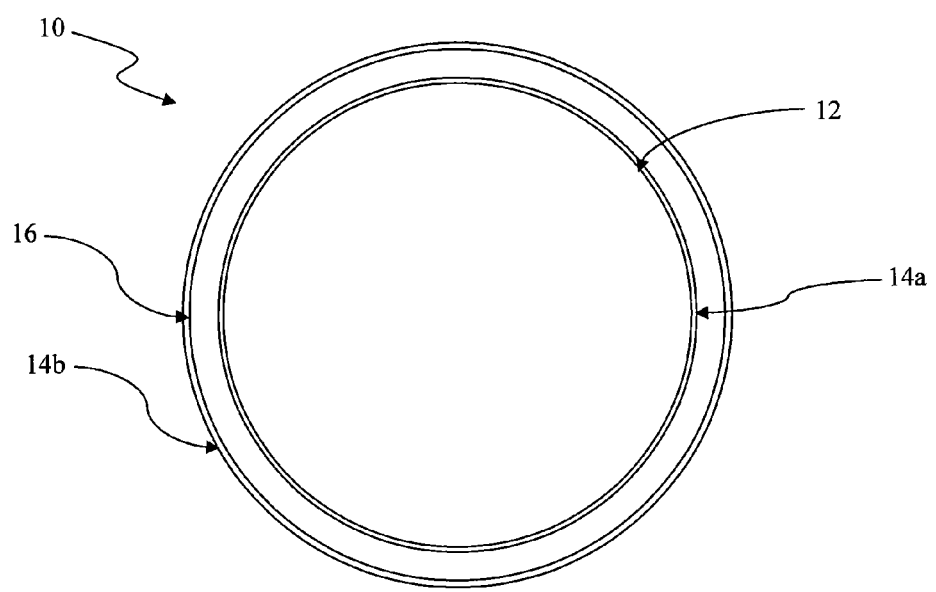
FIG. 2 is a cross-sectional view of a multi-component golf ball including at least one paint layer formed from a composition of the invention.

Referring to FIG. 1, a golf ball 2 of the present invention can include a center 4 and a cover 6 surrounding the center 4. Paint or a coating layer 8 may be applied to the cover 6, the center 4, or both. For example, referring to FIG. 2, a golf ball 10 of the present invention can include a center 12, a cover 16, and at least one paint layer 14a applied to the center 12. An additional paint layer 14b may be applied to the cover 16. Each of the cover and center layers in FIG. 1 or 2 may include more than one layer, i.e., the golf ball can be a conventional three-piece wound ball, a two-piece ball, a ball having a multi-layer core and an intermediate layer or layers, etc.

Figure 3:
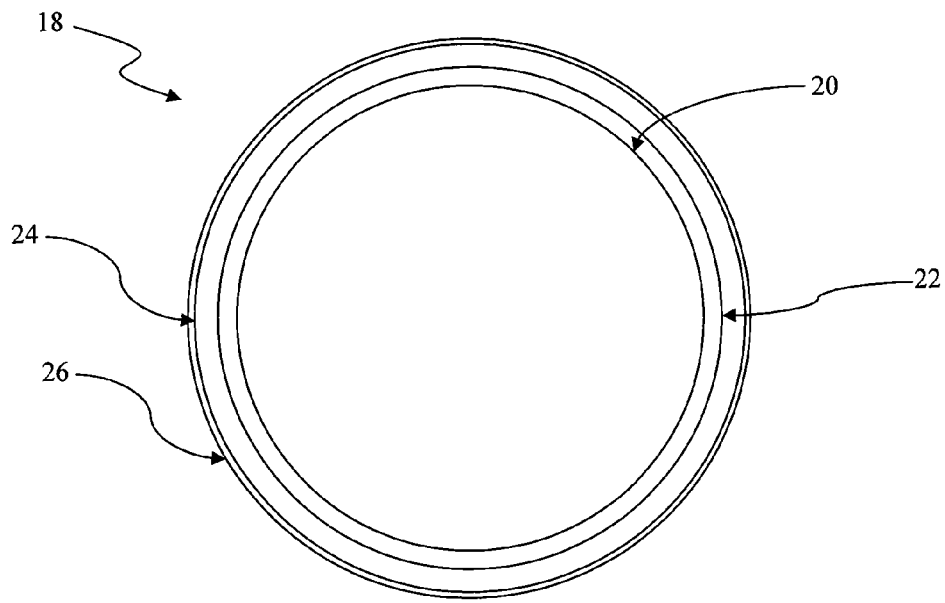
FIG. 3 is a cross-sectional view of a multi-component golf ball having a large core including at least one paint layer formed from a composition of the invention.

Also, FIG. 3 shows a golf ball 18 of the present invention including a large core 20, a cover 24, and an inner cover layer 22. In one embodiment, the core 20 includes a center and an outer core layer. The inner cover layer 22 and/or cover 24 may be formed from the conventional materials such as ionomers and polyurethanes, polyureas, and mixtures thereof. In one embodiment, a paint or coating layer 26 is formed from the composition of the invention and the cover 24 is formed from a polyurethane or polyurea material. In another embodiment, the inner cover layer 22 is formed from an ionomer resin.

Figure 4:
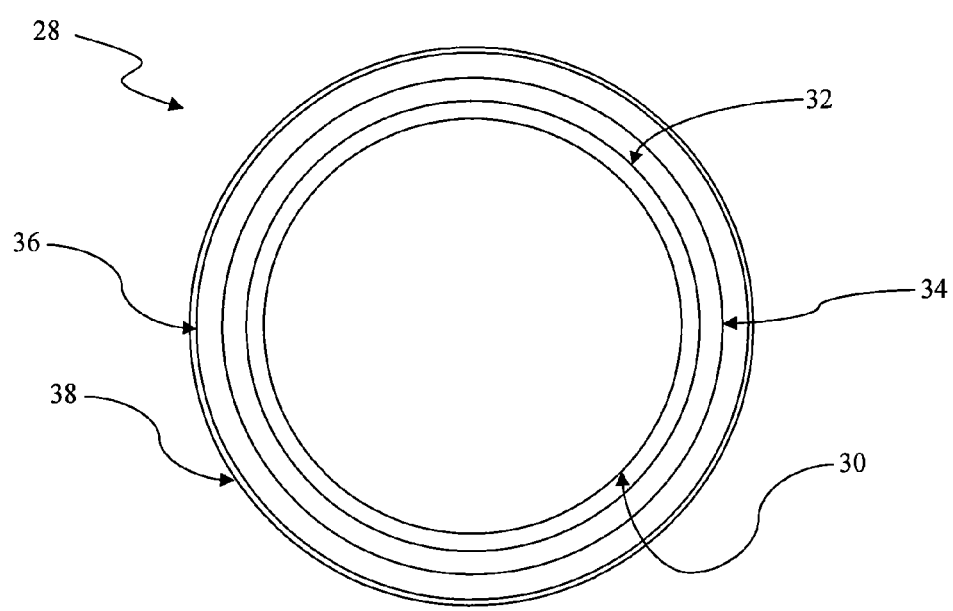
FIG. 4 is a cross-sectional view of a multi-component golf ball including a dual core and a dual cover, wherein at least one paint layer formed from a composition of the invention is applied to at least one structural layer of the golf ball.

In another embodiment, as shown in FIG. 4, a golf ball 28 of the present invention can include a large core having a center 30 and an intermediate layer 32 disposed underneath a dual cover having an inner cover layer 34 and an outer cover layer 36. The paint layer 38, which is applied to the outer cover layer 36 is formed from the compositions of the invention. In one embodiment, the inner cover layer 34 is formed from a thermoplastic composition, the outer cover layer 36 is formed from a polyurethane or polyurea composition, and the paint layer 38 is formed from the composition of the invention. Further, any of the figures detailed herein may include embodiments where an optional paint layer formed from the composition of the invention is disposed about one or more of the interior structural layers of the ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Any of the golf ball structural layers may be surface treated by conventional methods including blasting, mechanical abrasion, corona discharge, plasma treatment, and the like, and combinations thereof prior to application of the paint layer.

Paint Layer

Once the structural layer(s) are formed, the paint composition of the invention may be applied. In particular, as discussed, at least one paint layer may be applied to any structural layer of a golf ball. In one embodiment, more than one paint layer is used.

The paint layer(s) may be applied by any suitable method known to those of ordinary skill in the art. As would be readily understood by those of ordinary skill in the art, once the paint composition is sprayed, brushed, or applied through various other industrial processes such as powder coating, the layer undergoes what is known as film formation. Accordingly, the paint composition has a relatively low viscosity when it is applied to a structural layer and, once any solvent(s) evaporate, will result in a solid, high-molecular-weight, polymer-based adherent film. In one embodiment, the paint layer(s) is applied to the golf ball cover by an in-mold coating process, such as described in U.S. Pat. No. 5,849,168, which is incorporated in its entirety by reference herein.

The thickness of the paint layer may range from about 0.5 µm to about 500 µm. In one embodiment, the paint layer has a thickness ranging from about 0.5 µm to about 250 µm. For example, the paint layer may have a thickness of about 5 µm to about 50 µm. In another embodiment, the paint layer has a thickness ranging from about 275 µm to about 500 µm.

The adhesion strength of the paint layer, i.e., the strength required to pull the paint layer from the structural layer or substrate to which it is applied, may be about 5 lb/in or greater. In one embodiment, the adhesion strength is about 10 lb/in or greater. In another embodiment, the paint layer has an adhesion strength of about 20 lb/in or greater.

Similarly, when adhesion stability of the paint composition is tested after maintaining a painted substrate at 110° F. in 100 percent humidity for 10 days, the paint composition preferably has at least 95 percent adhesion. In one embodiment, when subjected to a cross-hatched adhesion test, the paint composition has at least 97 percent adhesion after 10 days at 110° F. in 100 percent humidity.

The moisture vapor transmission of a paint layer formed from the composition of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate the water resistance of paint layers formed from the composition of the invention. In one embodiment, golf balls incorporating paint layers formed from the composition of the invention have a weight gain of about 15 grams per 100 $in^2$ per day or less at 38° C. and 90 percent relative humidity. In another embodiment, golf balls incorporating paint layers formed from the composition of the invention have a weight gain of about 12.5 grams per 100 $in^2$ per day or less. In still another embodiment, the weight gain of golf balls incorporating paint layers formed from the composition of the invention is about 7 grams per 100 $in^2$ per day or less. In yet another embodiment, the weight gain is about 5 grams per 100 $in^2$ per day or less. For example, golf balls incorporating paint layers formed from the composition of the invention may have a weight gain of about 3 grams per 100 $in^2$ per day or less.

Since size gain may also be used as an indicator of water resistance, golf balls incorporating paint layers formed from the composition of the invention preferably have no appreciable size gain. In one embodiment, the size gain of the golf balls incorporating paint layers formed from the composition of the invention after a seven-week period is about 0.001 inches or less.

And, while not necessarily a property that is conventionally measured in golf balls, the thermal conductivity of a paint layer formed of the composition of the invention generally indicates the moisture and oxygen blocking characteristics of the composition. Thus, in one embodiment, a paint layer formed from the composition of the invention has a thermal conductivity ranging from about 0.03 to about 0.3 Btu/hr ft ° F. In another embodiment, the thermal conductivity ranges from about 0.05 to about 0.2 Btu/hr ft ° F. In still another embodiment, the thermal conductivity ranges from about 0.055 to about 0.19 Btu/hr ft ° F.

Similarly, the R-value of a paint layer formed of a composition of the invention is also indicative of the moisture and oxygen blocking characteristics of the composition. In one embodiment, the R-value, which is a function of the thickness of the layer when applied to a substrate and the thermal conductivity, may range from about 0.01 hr $ft^{2°}$ F./BTU to about 0.1 hr $ft^{2°}$ F./BTU. For example, the R-value of a paint layer formed of a composition of the invention may range from about 0.03 hr ft$^{2\circ}$ F./BTU to about 0.8 hr ft$^{2\circ}$ F./BTU. In another embodiment, the R-value is between about 0.02 and about 0.07 hr ft$^{2\circ}$ F./BTU.

As would be understood by those of ordinary skill in the art, the transparency of the composition of the invention when applied as a paint layer to a substrate is directly related to the absence of (or very low amounts of) scattering in the paint layer. In one embodiment, a paint layer formed from the composition of the invention may be optically clear or substantially clear and, thus, preferably allows all or most of the incident light pass through and not scatter, resulting in a transparent layer.

In another embodiment, a paint layer formed from a composition of the invention is translucent. In other words, a paint layer formed from a composition of the invention has a translucency that is the function of absorption, scattering and transparency. As would be understood by those of ordinary skill in the art, the contribution of each of these attributes in combination (as well as thickness and strength of the light source) will determine the perceived color and the amount of that color that passes through the paint layer.

In still another embodiment, the composition of the invention includes at least one pigment and, thus, the paint layer formed from the composition is the color of the pigment(s).

EXAMPLES

Example 1

A paint composition of the invention may be made according to the following formulation:

|  | Amount (percent by weight) |
| --- | --- |
| Polymer Component | 35-55 |
| Porous Particles | 2-8 |
| Stabilizing Component | 1-5 |
| Water | 25-35 |

Commercially available examples of polymer components include, but are not limited to, self-crosslinking epoxyacrylic copolymers from MeadWestVaco sold under the tradename Armorez® (e.g., Armorez® CR-2909, Armorez® CR-2912, Armorez® CR-2913, and Armorez® IC2954). Non-limiting examples of commercially available porous particles for use in the above formulation include silica aerogels from Cabot sold under the tradename Nanogel®. Commercially available examples of stabilizing components for use in the above formulation include, but are not limited to, EO-PO copolymers from BASF sold under the tradename Pluronic® (e.g., Pluronic® 17R2, Pluronic® L64, and Pluronic® L62) and EO-PO copolymers from Dow sold under the tradename Tergitol®. Other components that may be included in the formulation include pigments, thickeners, wetting agents and defoamers, dispersants, neutralizers and co-dispersants, propylene glycol, dibutyl phthalate, and dipropylene glycol n-butyl ether. The last component added is the porous particles.

Example 2

A golf ball may be formed with at least a core and a cover layer and a paint layer formed of the paint composition in Example 1. To the cover layer, the paint composition may be applied with a thickness ranging from 5 μm to 30 μm.

Example 3

An adhesion test of the paint composition of Example 1 may be conducted using a cross-hatched adhesion test, which involves the application of tape in a cross-hatch pattern obtained from a special cross-hatch cutter with multiple preset blades (to ensure the incisions are properly spaced and parallel). The cuts are made through the paint composition down to the underlying substrate surface. Pressure sensitive tape is then applied and removed over the cuts made in the paint layer. The tape is then removed from the cut area and inspected for any removed paint. The paint composition of the invention will have at least 95 percent adhesion after 10 days at 110° F. in 100 percent humidity.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein at least one paint layer is disposed about the cover, wherein the paint layer is formed from a composition comprising:
   a polymer component;
   a paste comprising porous particles and a stabilizing component, wherein the porous particles have an average diameter between about 100 μm to about 500 μm, wherein the stabilizing component comprises a symmetrical copolymer comprising two alkylene oxide blocks having the same chain length surrounding an alkylene oxide block, wherein the paint layer has a thermal conductivity ranging from about 0.03 to about 0.3 Btu/hr ft ° F; wherein the paint layer comprises an adhesion strength of about 5 lb/in or greater, and the golf ball has a weight gain of about 15 grams per 100 in$^2$ per day or less at 38° C. and 90 percent relative humidity; and wherein the paint layer has a thickness of about 275 μm to about 500 μm.

2. The golf ball of claim 1, wherein the stabilizing component comprises two ethylene oxide blocks of the same chain length surrounding a propylene oxide block.

3. The golf ball of claim 2, wherein the stabilizing component comprises $EO_x$—$PO_y$-$EO_z$ where x, y, and z represent chain length, and wherein x and z are equal.

4. The golf ball of claim 1, wherein the thermal conductivity ranges from about 0.5 to about 0.2 Btu/hr ft ° F.

5. The golf ball of claim 1, wherein the polymer component comprises polyesters, epoxies, urethanes, cellulosics, alkyds, acrylics, and mixtures and precursors thereof.

6. The golf ball of claim 1, wherein the porous particles have an average pore size from about 100 μm or less.

7. A golf ball comprising a core, a cover, and a paint layer disposed on the cover, wherein the paint layer is formed from a composition comprising:
- a resin system comprising a polymer component and a stabilizing component, wherein the stabilizing component is selected from the group consisting of ethylene oxide-propylene oxide block copolymers, poly $C_2$-$C_3$ alkoxylated $C_{12}$-$C_{18}$ saturated or unsaturated fatty alcohols, poly $C_2$-$C_3$ alkoxylated hydrogenated or partially hydrogenated castor oils, poly $C_2$-$C_3$ alkoxylated hydrogenated or partially hydrogenated soybean oils, polydimethyl siloxane $C_2$-$C_3$ alkoxylates, and sorbitan esters of $C_{12}$-$C_{18}$ saturated or unsaturated fatty acids;
- porous particles having an average diameter between about 5 μm to about 75 μm, and wherein the paint layer has a thermal conductivity ranging from about 0.03 to about 0.3 Btu/hr ft ° F. and an adhesion stability of about 95 percent after 10 days at 110° F. in 100 percent humidity, and
- wherein the paint layer has a thickness of about 275 μm to about 500 μm.

8. The golf ball of claim 7, wherein the resin system is solvent-based.

9. The golf ball of claim 7, wherein the resin system comprises an aqueous emulsion of the polymer component.

10. The golf ball of claim 7, wherein the thermal conductivity ranges from about 0.05 to about 0.2 Btu/hr ft ° F.

11. The golf ball of claim 7, wherein the thermal conductivity ranges from about 0.055 to about 0.19 Btu/hr ft ° F.

12. The golf ball of claim 7, wherein the porous particles have n average pore size from about 100 μm or less.

13. The golf ball of claim 7, wherein the golf ball has a weight gain of about 12.5 grams per 100 in$^2$ per day or less at 38° C. and 90 percent relative humidity.

14. The golf ball of claim 7, wherein the polymer component comprises an acrylic copolymer, an acrylic styrene copolymer, vinyl acrylic copolymer, epoxy acrylic copolymer, acrylic vinyl acetate copolymer, a styrene butadiene copolymer, a cellulose acetate polymer, an alkyd, a polyester polymer, or combinations thereof.

15. A golf ball comprising a core, a cover, and a paint layer disposed on the cover, wherein the cover comprises polyurethane, polyurea, or a combination thereof, and wherein the paint layer is formed from a composition comprising:
- a polymer component;
- a stabilizing component, wherein the stabilizing component is selected from the group consisting of ethylene oxide-propylene oxide block copolymers, poly $C_2$-$C_3$ alkoxylated $C_{12}$-$C_{18}$ saturated or unsaturated fatty alcohols, poly $C_2$-$C_3$ alkoxylated hydrogenated or partially hydrogenated castor oils, poly $C_2$-$C_3$ alkoxylated hydrogenated or partially hydrogenated soybean oils, polydimethyl siloxane $C_2$-$C_3$ alkoxylates, and sorbitan esters of $C_{12}$-$C_{18}$ saturated or unsaturated fatty acids;
- porous particles having an average diameter between about 100 μm to about 500 μm, wherein the paint layer has a thermal conductivity ranging from about 0.05 to about 0.2 Btu/hr ft ° F. and an adhesion strength of about 10 lb/in or greater,
- wherein the golf ball has a soze gain of about 0.001 inches or less after a seven-week period, and
- wherein the paint layer has a thickness of about 275 μm to about 500 μm.

16. The golf ball of claim 15, wherein the core comprises polybutadiene.

17. The golf ball of claim 15, wherein the polymer component is present in an aqueous emulsion.

18. The golf ball of claim 15, wherein the polymer component is part of a solvent-based resin system.

19. The golf ball of claim 18, wherein the porous particles comprise organic and inorganic aerogels, organic and inorganic xerogels, or combinations thereof.

20. The golf ball of claim15, wherein the porous particles have an average pore size from about 100 μm or less.

* * * * *